Patented Oct. 10, 1950

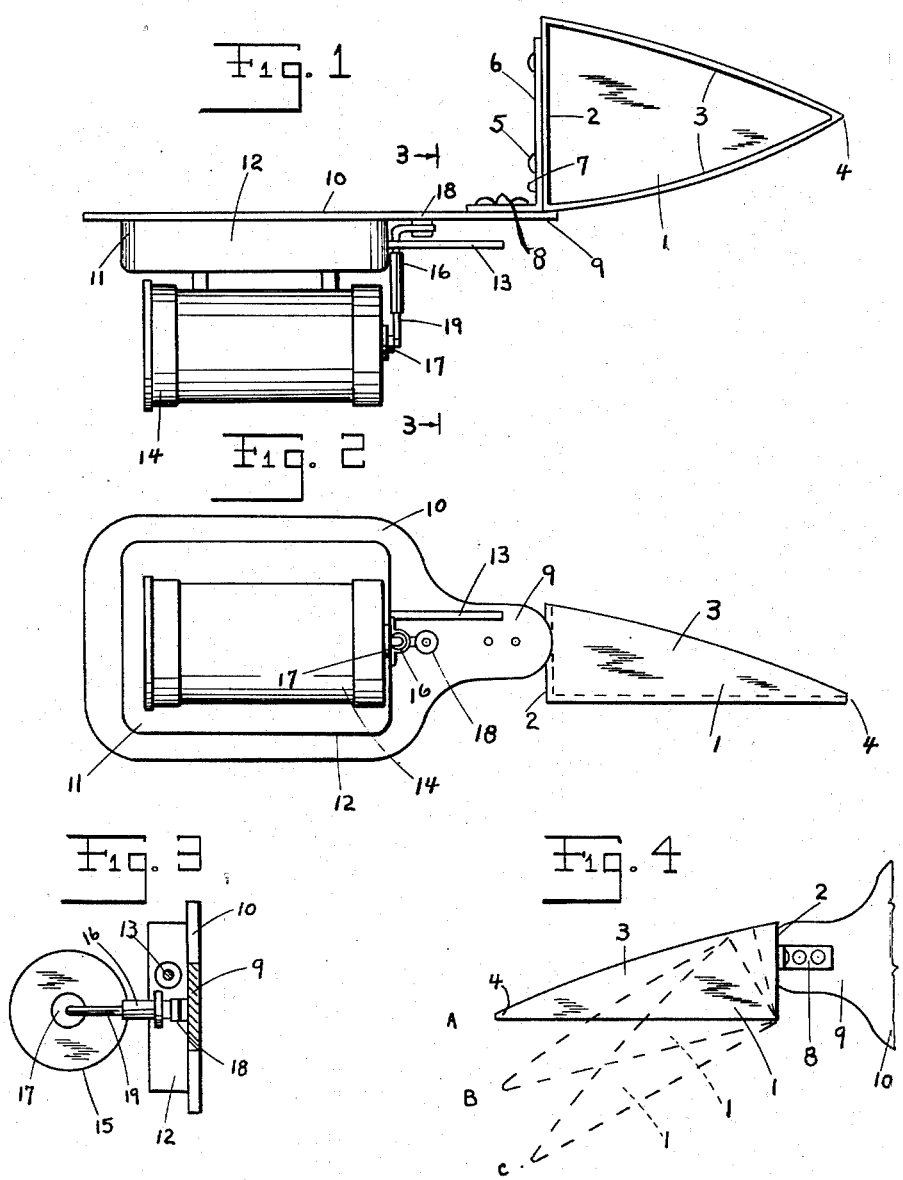
INVENTOR.
EDWARD F. BOUSKA

2,525,641

UNITED STATES PATENT OFFICE 2,525,641

VIBRATORY SEEDER

Edward F. Bouska, Hinsdale, Ill.

Application March 23, 1945, Serial No. 584,328

1 Claim. (Cl. 111—82)

My present invention, in its broad aspect, has reference to improvements in devices for distributing seed for planting, and more particularly, it is my purpose to provide a seeder wherein the distributing hopper is vibrated by reason of impulses imparted to its support by an electrical vibrator. My invention is portable and designed to be held in the hand and operated by a suitable small dry cell battery, such as a flash light battery, the vibrator may be of any suitable type with the usual vibrating armature; the distributing hopper holds the seeds and is in the nature of a triangular trough, attached by an arm to the support on which is mounted the vibrator. The motion of the vibrator is transmitted to the support and thence to the hopper or seed distributing trough by mechanical transference of motion to the end that the seeds are agitated and dispensed from the trough or hopper; the manner of holding the hopper or trough (its position with respect to the furrow) determining the amount of seeds distributed.

Other and equally important objects and advantages of my invention will be apparent from the following description and drawing, and it is pointed out that changes in form, size, shape, construction and arrangement of parts is permissible and within the purview of my broad inventive concept, and the scope of the appended claim.

In the drawings wherein I have illustrated a preferred form of my invention—

Figure 1 is a top plan view;

Figure 2 is a side elevation;

Figure 3 is a section on the line 3—3 of Figure 1, and

Figure 4 is a detail of my seed distributing trough or hopper.

In the drawings wherein like characters of reference are used to designate like or similar parts—

The numeral 1 designates my seed distributing trough or hopper, which has a flat back 2, and a uniformly curved wall 3 tapering on both sides of a medial line to the point 4 at the front. In Figure 4 are shown three positions of the hopper; the full line horizontal position A distributing the least number of seeds in a furrow, and the two dotted line positions B and C having an increased angle of inclination; the greater the angle of inclination, the most seeds distributed. The positions previously referred to are obtained by holding the entire unit at horizontal position, as shown in full lines in Figure 4, or lowering the seeder to the inclinations shown by the dotted lines. In horizontal position, fewer seeds are adjacent the forward end of the seeder than when it is inclined as indicated. Thus more seeds are sown as the seeder is inclined below the horizontal.

Extending transversely across the back of the hopper and attached thereto, as at 5, is one arm 6 of a right angular support 7; the other arm 8 being attached to the extended part 9 of a base 10 on which is mounted an electrical vibrator 11.

The vibrator 11 may be of any suitable form or type and is contained in the housing 12 mounted on the support 7. The armature 13 of the electric vibrator extends outside of the housing in the position shown in Figures 1 and 2. The movement or vibration of the armature is designed to produce vibration in the support and the trough or hopper thereby agitating seeds to be distributed and effecting more even distribution of the same in a furrow with less trouble and effort.

Attached to the housing 12 is a battery casing 14 to receive a suitable dry cell battery 15 in such as a flash light battery—and the switch 16 leads down from the center contact 17 to the contact 18 of the vibrator. The switch has a spring metal plate 19 which may be pressed by the finger to place the vibrator in circuit with the battery.

From the foregoing it is believed that the operation and advantages of my invention will be apparent, but it is again emphasized that interpretation of the scope of my invention shall only be conclusive when made in the light of the subjoined claim.

I claim:

A hand operated seeder, comprising a seed distributing pre-shaped hopper having a flat back and curved side walls tapering to a point, an electric vibrator having a free armature, a support for the vibrator, an extension on the support, a housing for the vibrator secured to said support, a right angular shaped bracket connecting the back wall of the seed distributing hopper with the extension on the support, a battery housing secured to said vibrator housing, a battery in said housing, a switch connecting said battery with said vibrator, said switch being mounted on said vibrator and adapted for manual actuation for energizing of the vibrator to cause the vibration of said seed distributing hopper.

EDWARD F. BOUSKA.

REFERENCES CITED

The following references are of record in the file of this patent:

UNITED STATES PATENTS

| Number | Name | Date |
| --- | --- | --- |
| 1,545,376 | Weatherby | July 7, 1925 |
| 2,044,326 | Pickell | June 16, 1936 |
| 2,246,497 | Beck | June 24, 1941 |
| 2,278,150 | Roscoe | Mar. 31, 1942 |
| 2,346,882 | Vredenburg | Apr. 18, 1944 |

FOREIGN PATENTS

| Number | Country | Date |
| --- | --- | --- |
| 31,220 | Denmark | Feb. 5, 1923 |